United States Patent [19]

O'Conor

[11] 4,340,645

[45] Jul. 20, 1982

[54] LEADLESS GLAZES FOR WHITEWARE

[75] Inventor: Eugene F. O'Conor, Towson, Md.

[73] Assignee: Mobay Chemical Corporation, Pittsburgh, Pa.

[21] Appl. No.: 262,086

[22] Filed: May 11, 1981

[51] Int. Cl.$^3$ .................. C03C 5/00; C03C 9/00; C03C 3/08; B32B 17/06

[52] U.S. Cl. .................. 428/428; 428/432; 501/17; 501/20; 501/26; 501/67

[58] Field of Search .............. 501/26, 67, 17, 20; 428/428, 432

[56] References Cited

U.S. PATENT DOCUMENTS

| | | | |
|---|---|---|---|
| 3,527,649 | 9/1970 | Sullivan | 501/17 |
| 3,871,890 | 3/1975 | Eppler et al. | 501/20 |
| 4,084,976 | 4/1978 | Hinton | 428/432 |
| 4,297,141 | 10/1981 | Tokunaga et al. | 501/67 |

FOREIGN PATENT DOCUMENTS 675013  7/1979  U.S.S.R. .................. 501/67

Primary Examiner—Mark Bell
Attorney, Agent, or Firm—Gene Harsh; Joseph C. Gil; Lyndanne M. Whalen

[57] ABSTRACT

The present invention is directed to ceramic frits for use in ceramic glazes and to the glazes themselves which when fired consist essentially of:

| Constituent | % by Weight |
|---|---|
| Alkali ($K_2O$, $Na_2O$, $Li_2O$) | 3.5 to 6.5 |
| ZnO | 6.0 to 12.5 |
| CaO | 6.0 to 12.0 |
| MgO | 0 to 0.7 |
| BaO | 0 to 5.0 |
| SrO | 1.7 to 4.0 |
| $B_2O_3$ | 2.0 to 6.0 |
| $Al_2O_3$ | 7.0 to 12.0 |
| $SiO_2$ | 53.0 to 61.0 |
| $ZrO_2$ | 0 to 8.0 |

5 Claims, No Drawings

LEADLESS GLAZES FOR WHITEWARE

BACKGROUND OF THE INVENTION

There has been interest for many years in the development of a leadless glaze with a low melting temperature, a low viscosity, a wide firing range, and a high index of refraction characteristic of lead-containing glazes. There are several reasons for this interest. Occasional episodes of lead toxication have resulted from the use of improperly fired and formulated lead-containing glazes on ceramic ware. While it is easy to prepare lead-containing glazes which are safe (and, in fact, some of the most resistant glazes contain lead), the problem of lead toxication is avoided completely through the use of leadless glazes. In addition, limits on the lead content of waste water dumped into rivers and streams have been enacted in most states. Moreover, recent governmental regulations mandate reductions in blood lead levels for workers exposed to lead. These regulations require installation of costly new equipment by those who utilize lead-containing glazes. This expense would be avoided completely through the use of a leadless glaze. Finally, since lead-containing glazes are considerably more corrosive to kiln refractories than leadless glazes, an extension in kiln life could be expected through the use of a leadless glaze.

A number of leadless glazes have been known for many years. Glazes which are fired in excess of 1250° F. commonly have been leadless. This is because glazes containing lead break down above 1250° C. with excessive volatilization of lead oxide. These high-temperature glazes are used on sanitary ware and on hard paste porcelain. These leadless glazes are not, however, suitable for use on most of dinnerware, tile, and artware because of the very high maturation temperature.

Complex alkali, alkaline earth, boroaluminosilicate glazes have been developed, which in the laboratory can be successfully applied to dinnerware-type bodies. However, when use of these glazes is attempted on a commercial scale, defects are often encountered. In addition, glazes for semivitreous earthenware which combine these complex glazes with high alkali porcelain glazes have been developed. These glazes, however, have been unsuitable for vitreous dinnerware, artware and tile because of their high coefficient of thermal expansion which produces crazing on the substrate used.

The use of zinc oxide in glazes is also well known. In small amounts, it is a very active flux, although when added in larger quantities it may produce a matte. It is seldom used below 950° C. because at the lower temperature it does not have much fluxing power. In conjunction with other fluxes, such as alkalis and boric acid, zinc is a very valuable material, contributing to the creation of a smooth, defect-free glaze surface. Conversely, when used in very large quantities, zinc oxide may lead to crawling, pitting and pinholing. However, there is one major problem with the use of zinc. In glazes of the prior art, zinc is known to have a profound effect on colors obtained from the various pigmenting materials. Many such pigmenting materials cannot be used. As a result, while zinc has been used in glazes for sanitary ware and tile where a limited palette of color is acceptable, it has not been used in dinnerware or artware glazes where a full palette of colors is required. Zinc has also not been used in decorative tile where the full palette of color is required.

DESCRIPTION OF THE INVENTION

The present invention is directed to the discovery of a narrow range of formulations in which it is possible to combine the beneficial effects of zinc oxide with adequate stability of underglaze colored decorations to permit the use of a whole palette of color. More particularly, the present invention is directed to a ceramic frit, which when smelted consists essentially of (a) from 4.0 to 6.5 percent by weight of a compound selected from the group consisting of potassium oxide, sodium oxide, lithium oxide, and mixtures thereof; (b) from 7.0 to 12.5 percent by weight of zinc oxide; (c) from 7.0 to 12.0 percent by weight of calcium oxide; (d) from 0 to 0.7 percent by weight of magnesium oxide; (e) from 0 to 5.0 percent by weight of barium oxide; (f) from 2.0 to 4.0 percent by weight of strontium oxide; (g) from 2.5 to 6.0 percent by weight of boric oxide; (h) from 7.0 to 8.5 percent by weight of aluminum oxide; (i) from 54.0 to 60.0 percent by weight of silica; and (j) from 0 to 1.0 percent by weight of zirconium oxide; all said percents by weight being based on the total weight of all of said components (a) through (j).

The present invention is also directed to a ceramic glaze produced from the above-noted ceramic frit. In general, the ceramic glaze of the present invention comprises at least 80 percent by weight of the above-noted ceramic frit, with the balance being selected from the group consisting of bentonite, clay, flint, alumina, pigments, opacifiers and mixtures thereof. After firing, this glaze will have a composition consisting essentially of (a) from 3.5 to 6.5 percent by weight of a member selected from the group consisting of potassium oxide, sodium oxide, lithium oxide, and mixtures thereof; (b) from 6.0 to 12.5 percent by weight of zinc oxide; (c) from 6.0 to 12.0 percent by weight of calcium oxide; (d) from 0 to 0.7 percent by weight of magnesium oxide; (e) from 0 to 5.0 percent by weight of barium oxide; (f) from 1.7 to 4.0 percent by weight of strontium oxide; (g) from 2.0 to 6.0 percent by weight of boric acid; (h) from 7.0 to 12.0 percent by weight of aluminum oxide; (i) from 53.0 to 61.0 percent by weight of silica; (j) from 0 to 8.0 percent by weight of zirconium oxide (which includes any opacifier used); all such weights being based on the total weight of components (a) through (j) plus any additional pigments added to color such glaze. This glaze may also be prepared in whole or in part directly from the raw materials without first making a frit. Finally, the present invention also relates to a product produced using the novel ceramic glaze herein. In general, the glaze is applied to a ceramic body and the coated body is fired at from 1900° to 2200° F.

When the total concentration of alkalis (i.e., potassium, sodium and/or lithium oxides) is reduced below 3.5 percent by weight in the glaze, the glaze will lack adequate flowability to form a smooth coating during firing. When the total concentration exceeds 6.5 percent by weight, there is excessive degradation of underglaze decorations. The amounts of each of the three (3) alkalis is not critical, so long as the total amount of all three is within the range noted.

When the concentration of zinc oxide is reduced below 6.0 percent by weight in the glaze, it ceases to act as a flux to produce a defect-free surface. Similarly, when the concentration of zinc oxide exceeds 12.5 percent by weight, the typical zinc oxide defects of pitting and pinholing are encountered.

When the concentration of calcium oxide is reduced below 6.0 percent by weight in the glaze, inadequate stability of certain underglaze colors and, in particular, chrome-tin pinks, is found. When the concentration exceeds 12.0 percent by weight, there is inadequate flowability in the glaze.

A small amount of magnesium oxide is generally useful in reducing the coefficient of expansion of the glaze. However, it should be limited to 0.7 percent by weight because magnesium oxide causes the development of short working range.

Barium oxide may be used in order to increase the refractive index of the glaze. However, it should be limited to 5.0 percent by weight in order to assure adequate flowability of the coating.

Glazes containing less than 1.7 percent by weight of strontium oxide will generally contain excess concentrations of active fluxes that degrade the underglaze decorations. On the other hand, concentrations in excess of 4.0 percent by weight will reduce the flowability of the coating.

The concentration of boric acid must be at least 2.0 percent by weight in order to ensure that the coating has adequate flowability. However, it must not exceed 6.0 percent by weight in order to avoid excessive degradation of the underglaze decorations.

The concentration of silica must be at least 53.0 percent by weight to avoid destroying the underglaze decorations. The concentration must not exceed 61.0 percent by weight or inadequate flowability will result.

The concentration of aluminum oxide in the glaze must be from 7.0 to 12.0 percent by weight in order to maintain a proper relationship to the silica concentrations, in accordance with well-known practice. Small additions of zirconium oxide, up to 1.0 percent by weight, may be added in order to improve the durability of the glaze. Up to 8.0 percent by weight opacifier grade zirconium oxide may be added to provide opacification.

The raw materials for manufacture of these glazes are those conventionally used in the glassmakers' art for supplying silica, alumina, and the other metal oxides required. Most of these materials are either oxides or carbonates. Normally the raw materials are weighed out and blended. They are then smelted to a glass and subsequently fritted. The dry frit is then ball-milled for several hours to a powder. Subsequently, a slip for application is prepared in a manner conventional to those skilled in this art. Some typical formulas include:

| (a) Powdered Frit | 100 parts |
| Bentonite | 2 parts |
| Water | 45 parts |
| (b) Powdered Frit | 90 parts |
| Kaolin Clay | 10 parts |
| Water | 45 parts |

However, as is well known in the art, higher portions of the glaze formulation may be added directly to the glaze slip without prior fritting. The slip is ball-milled and then adjusted to proper viscosity with addition of further water. It is then applied to a conventional ceramic body by one of the well-known application methods such as spraying, dipping or waterfall. The coated ceramic body is then dried and placed in a ceramic kiln for firing. Firing is generally accomplished at temperatures of 1900° to 2200° F. in accordance with conventional firing schedules. The result of this process is a glaze on the ceramic body which is free of defects, free of crazing and one which has not destroyed any underglaze decorations previously placed upon the ceramic body.

The invention is further illustrated, but is not intended to be limited by the following examples in which all parts and percentages are by weight unless otherwise specified.

EXAMPLES

EXAMPLE 1

The following raw materials of standard grade and quality for ceramic applications were weighed out and mixed in a twin-shell blender:

| Material | Amount |
| --- | --- |
| Silica | 1162 parts |
| Feldspar | 813 parts |
| Zinc Oxide | 335 parts |
| Boric Acid | 294 parts |
| Whiting | 507 parts |
| Zircon | 23.4 parts |
| Strontium Carbonate | 134 parts |
| Barium Carbonate | 98 parts |
| Potassium Carbonate | 64 parts |
| Calcined Alumina | 65 parts |
| Magnesium Oxide | 4.8 parts |

This batch was placed in a smelter and smelted at 2500° F. for 35 minutes. It was then poured into water to frit it, and the frit was allowed to dry. The frit had the following composition:

| Oxide | Amount |
| --- | --- |
| $K_2O$ | 2.70% |
| $Na_2O$ | 1.83% |
| CaO | 9.43% |
| MgO | 0.40% |
| BaO | 2.49% |
| SrO | 3.06% |
| ZnO | 10.94% |
| $B_2O_3$ | 5.41% |
| $Al_2O_3$ | 7.33% |
| $SiO_2$ | 55.89% |
| $ZrO_2$ | 0.51% |

The frit was then dried and ball-milled. Subsequently, 100 parts of the ball-milled frit, 2 parts of bentonite, and 45 parts of water were ball-milled together for one hour and the mixture sprayed onto bisque-fired ceramic dinnerware, and onto tile previously coated with underglaze decorations. The coated bodies were then dried and fired at 2150° F. for one hour.

The tile previously coated with underglaze decorations was then examined visually for stability of the decorations and absence of opalescence. The tile was then rated on a scale from one to ten where one was a coating that had degraded and ten was a coating which was completely stable. The tile of Example 1 was rated a seven.

The dinnerware plates were then examined visually for gloss and for surface defects such as pinholes, stones, or seeds. The extent of defects was ranked on a scale of one to ten with one being a coating with no more than one observed defect while a ranking of ten is a coating with substantial defects. Example 1 has a rating of three.

As an indication of the ability of the glaze to flow over the substrate and coat it during firing, the donut test was run. This test involves heating donut-shaped specimens in the furnace until appreciable softening occurs. The diameter of the inner hole of the donut is then measured. A standard is used in all cases and the experimental results adjusted to a consistent basis. The results are reported in millimeters and the smaller the number the more flowable is the coating. Example 1 had a 10 mm diameter.

EXAMPLES 2 THROUGH 7

The raw batches given in Table I were weighed out and mixed in a twin-shell blender. These batches were placed in a smelter and smelted at 2500° F. for 35 minutes. They were then poured into water to frit them and the frit was allowed to dry. The frits then had the compositions given in Table II.

The frits were then dried and ball-milled. Subsequently, 100 parts of the ball-milled frit, 2 parts of bentonite, and 45 parts of water were ball-milled together for one hour and the mixtures sprayed onto bisque-fired ceramic dinnerware and onto tile previously coated with underglaze decorations. The coated bodies were then dried and fired at 2150° F. for one hour.

The fired products were then examined visually for stability of underglaze decorations, glaze defects and for flowability as described in Example 1. The results were as recorded in Table III.

In all cases, the underglaze color stability was rated 4 or higher. The glaze defects were rated 5 or less. The flowability as measured by the donut test was found to be 14 mm or less.

In order to illustrate the criticality of the limits called for in this invention, there will be found in Table IV the formulas of seven frits which were very similar to the examples above, but different in at least one respect from the limits claimed. Composition A had excessive boric oxide. Composition B was too low in silica. Composition C was too high in zinc oxide, as was Composition D. Composition E was too high in silica. Composition F was too low in zinc oxide, and Composition G was too high in alkalis.

When these frits were prepared in ceramic glazes in the same manner as that described for Example 1, and the resulting ceramic ware evaluated, the results found in Table V were obtained. In each case, one or more of the results were found to be inferior to those found for the glazes of this invention. Examples A, B, C, D and G had underglaze color stability which was inferior to the glazes of this invention. Glazes B, C and F had a significantly higher incidence of glaze defects than the glazes of this invention. Glaze E was appreciably less flowable than the glazes of this invention.

TABLE I

| MATERIAL | EXAMPLES 2-7 RAW BATCHES USED | | | | | |
|---|---|---|---|---|---|---|
| | 2 | 3 | 4 | 5 | 6 | 7 |
| Silica | 1013 parts | 1037 parts | 1163 parts | 1205 parts | 1189 parts | 1045 parts |
| Feldspar | 1046 parts | 1071 parts | 959 parts | 993 parts | 832 parts | 1079 parts |
| Zinc Oxide | 336 parts | 266 parts | 239 parts | 319 parts | 265 parts | 347 parts |
| Boric Acid | 295 parts | 194 parts | 270 parts | 180 parts | 193 parts | 195 parts |
| Whiting | 462 parts | 547 parts | 490 parts | 438 parts | 592 parts | 476 parts |
| Zircon | 23.5 parts | 24 parts | 23.7 parts | 24.5 parts | 23.9 parts | 24.2 parts |
| Strontium Carbonate | 125 parts | 145 parts | 130 parts | 118 parts | 156 parts | 129 parts |
| Barium Carbonate | 90 parts | 105 parts | 94 parts | 86 parts | 112 parts | 93 parts |
| Potassium Carbonate | 84 parts | 85 parts | 77 parts | 79 parts | 66 parts | 86 parts |
| Calcined Alumina | 20.5 parts | 21 parts | 50 parts | 52 parts | 67 parts | 21.1 parts |
| Magnesium Oxide | 4.5 parts | 5.1 parts | 4.6 parts | 4.3 parts | 5.4 parts | 4.7 parts |

TABLE II

| | EXAMPLES 2-7 COMPOSITIONS OF FRITS (WEIGHT PERCENT) | | | | | |
|---|---|---|---|---|---|---|
| Oxide | 2 | 3 | 4 | 5 | 6 | 7 |
| $K_2O$ | 3.48 | 3.57 | 3.19 | 3.24 | 2.77 | 3.55 |
| $Na_2O$ | 2.34 | 2.40 | 2.15 | 2.18 | 1.87 | 2.39 |
| CaO | 8.71 | 10.24 | 9.16 | 8.10 | 10.97 | 8.89 |
| MgO | 0.37 | 0.43 | 0.38 | 0.34 | 0.46 | 0.38 |
| BaO | 2.29 | 2.68 | 2.39 | 2.13 | 2.87 | 2.34 |
| SrO | 2.84 | 3.30 | 2.96 | 2.64 | 3.57 | 2.90 |
| ZnO | 10.92 | 8.66 | 7.75 | 10.15 | 8.67 | 11.13 |
| $B_2O_3$ | 5.40 | 3.55 | 4.96 | 3.22 | 3.56 | 3.54 |
| $Al_2O_3$ | 7.32 | 7.50 | 7.72 | 7.83 | 7.51 | 7.47 |
| $SiO_2$ | 55.81 | 57.16 | 58.81 | 59.64 | 57.23 | 56.91 |
| $ZrO_2$ | 0.51 | 0.52 | 0.52 | 0.52 | 0.52 | 0.52 |

TABLE III

| | EXAMPLES 2-7 RESULTS OBTAINED | | | | | |
|---|---|---|---|---|---|---|
| | 2 | 3 | 4 | 5 | 6 | 7 |
| Underglaze Color Stability | 4 | 7 | 5 | 7 | 10 | 7 |
| Glaze Defects | 2 | 2 | 3 | 1 | 5 | 4 |
| Donut Test | 11 | 10 | 14 | 13 | 13 | 11 |

TABLE IV

| | COMPOSITIONS OF FRITS SIMILAR TO, BUT EXCLUDED FROM STATED LIMITS (WEIGHT PERCENT) | | | | | | |
|---|---|---|---|---|---|---|---|
| Oxide | A | B | C | D | E | F | G |
| $K_2O$ | 2.55 | 2.95 | 3.47 | 2.69 | 2.24 | 2.72 | 4.22 |
| $Na_2O$ | 1.72 | 2.00 | 2.33 | 1.82 | 1.52 | 1.85 | 2.88 |
| CaO | 8.88 | 10.29 | 7.33 | 8.04 | 7.82 | 12.04 | 8.01 |
| MgO | 0.38 | 0.44 | 0.32 | 0.35 | 0.33 | 0.51 | 0.33 |
| BaO | 2.34 | 2.72 | 1.97 | 2.10 | 2.06 | 3.15 | 2.10 |
| SrO | 2.88 | 3.34 | 2.40 | 2.62 | 2.54 | 3.91 | 2.58 |
| ZnO | 10.30 | 11.94 | 13.46 | 13.49 | 9.07 | 6.14 | 10.91 |
| $B_2O_3$ | 10.91 | 5.91 | 5.38 | 5.39 | 4.49 | 5.46 | 5.40 |
| $Al_2O_3$ | 6.91 | 6.94 | 7.29 | 7.30 | 8.05 | 7.39 | 7.31 |
| $SiO_2$ | 52.65 | 52.97 | 55.55 | 55.68 | 61.32 | 56.32 | 55.75 |
| $ZrO_2$ | 0.48 | 0.50 | 0.51 | 0.51 | 0.55 | 0.52 | 0.51 |

TABLE V

| RESULTS OBTAINED GLAZES SIMILAR TO, BUT EXCLUDED FROM STATED LIMITS | | | | | | |
|---|---|---|---|---|---|---|
| A | B | C | D | E | F | G |

Underglaze Color

TABLE V-continued

RESULTS OBTAINED GLAZES SIMILAR TO, BUT EXCLUDED FROM STATED LIMITS

|  | A | B | C | D | E | F | G |
|---|---|---|---|---|---|---|---|
| Stability | 1 | 3 | 1 | 1 | 6 | 4 | 1 |
| Glaze Defects | 5 | 9 | 9 | 5 | 4 | 6 | 0 |
| Donut Test | 9 | 9 | 10 | 9 | 17 | 12 | 9 |

What is claimed is:

1. A ceramic frit which, when smelted, consists essentially of:
   (a) from 4.0 to 6.5 percent by weight of a member selected from the group consisting of potassium oxide, sodium oxide, lithium oxide and mixtures thereof;
   (b) from 7.0 to 12.5 percent by weight of zinc oxide;
   (c) from 7.0 to 12.0 percent by weight of calcium oxide;
   (d) from 0 to 0.7 percent by weight of magnesium oxide;
   (e) from 0 to 5.0 percent by weight of barium oxide;
   (f) from 2.0 to 4.0 percent by weight of strontium oxide;
   (g) from 2.5 to 6.0 percent by weight of boric oxide;
   (h) from 7.0 to 8.5 percent by weight of aluminum oxide;
   (i) from 54.0 to 60.0 percent by weight of silica; and,
   (j) from 0 to 1.0 percent by weight of zirconium oxide;
all said percents by weight being based on the total weight of components (a) through (j).

2. A ceramic glaze comprising at least 80 percent by weight of the frit of claim 1, with the balance being selected from the group consisting of bentonite, clay, flint, alumina, pigments, opacifiers and mixtures thereof.

3. A product produced by applying the glaze of claim 2 to a ceramic body and firing the coated body at 1900°–2200° F.

4. A ceramic glaze which, after firing, consists essentially of:
   (a) from 3.5 to 6.5 percent by weight of a member from the group consisting of potassium oxide, sodium oxide, lithium oxide and mixtures thereof;
   (b) from 6.0 to 12.5 percent by weight of zinc oxide;
   (c) from 6.0 to 12.0 percent by weight of calcium oxide;
   (d) from 0 to 0.7 percent by weight of magnesium oxide;
   (e) from 0 to 5.0 percent by weight of barium oxide;
   (f) from 1.7 to 4.0 percent by weight of strontium oxide;
   (g) from 2.0 to 6.0 percent by weight of boric acid;
   (h) from 7.0 to 12.0 percent by weight of aluminum oxide;
   (i) from 53.0 to 61.0 percent by weight of silica;
   (j) from 0 to 8.0 percent by weight of zirconium oxide;
all such weights being based on the total weight of components (a) through (j) plus any additional pigments added to color such glaze.

5. A product produced by applying the glaze of claim 4 to a ceramic body and firing the coated body at 1900°–2200° F.

* * * * *